(12) United States Patent
Brinkman et al.

(10) Patent No.: US 10,567,472 B2
(45) Date of Patent: *Feb. 18, 2020

(54) MANIPULATION OF PDF FILES USING HTML AUTHORING TOOLS

(71) Applicant: Adobe Inc., San Jose, CA (US)

(72) Inventors: John Brinkman, Ottawa (CA); Leonard Rosenthol, Huntingdon Valley, PA (US)

(73) Assignee: Adobe Inc., San Jose, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 15/178,130

(22) Filed: Jun. 9, 2016

(65) Prior Publication Data
US 2017/0359403 A1    Dec. 14, 2017

(51) Int. Cl.
G06F 17/27    (2006.01)
H04L 29/08    (2006.01)
G06F 17/21    (2006.01)

(52) U.S. Cl.
CPC ............ H04L 67/06 (2013.01); G06F 17/211 (2013.01); G06F 17/2705 (2013.01)

(58) Field of Classification Search
CPC .. G06F 3/0482; G06F 17/211; G06F 17/2705; H04L 67/06
USPC ........................................................ 715/234
See application file for complete search history.

(56) References Cited

U.S. PATENT DOCUMENTS

| 7,653,876 | B2* | 1/2010 | Ethier ............... G06F 17/218 715/249 |
| 7,698,628 | B2* | 4/2010 | Perelman ........... G06F 17/243 715/221 |
| 7,895,578 | B2* | 2/2011 | Tsai .................... G06F 8/38 707/805 |
| 8,209,598 | B1* | 6/2012 | Pandey ............... G06F 9/541 715/205 |

(Continued)

OTHER PUBLICATIONS

Gite, "Linux / UNIX FTP Commands Tutorial," 2013, available at https://www.cyberciti.biz/faq/linux-unix-ftp-commands/ (Year: 2013).*

(Continued)

*Primary Examiner* — Maikhanh Nguyen
(74) *Attorney, Agent, or Firm* — Finch & Maloney PLLC

(57) ABSTRACT

Techniques are disclosed for extraction and modification of Portable Document Format (PDF) file content using Hyper Text Markup Language (HTML) based authoring tools on File Transfer Protocol (FTP) clients. A PDF FTP processor is configured to map components of stored PDF files to a hierarchical directory structure, and to receive FTP commands from a client application which identifies a PDF document and a type of access or operation (e.g., content or attribute modification, content extraction, etc.). The FTP commands also identify components of the PDF document upon which the requested operations are to be performed. The PDF FTP processor is further configured to invoke function calls to a PDF parser library to perform the requested operations. These techniques enable client software to access and manipulate the PDF document in a relatively simple and efficient manner, for example through HTML authoring tools that communicate to the server through FTP commands.

14 Claims, 6 Drawing Sheets

(56) References Cited

U.S. PATENT DOCUMENTS

| | | | |
|---|---|---|---|
| 2004/0199876 A1* | 10/2004 | Ethier | G06F 17/218 715/249 |
| 2015/0074522 A1 | 3/2015 | Harned, III et al. | |
| 2015/0113019 A1 | 4/2015 | Jiang et al. | |
| 2017/0337216 A1 | 11/2017 | Brinkman et al. | |

OTHER PUBLICATIONS

Subhash, "How to Read a PDF File From a URL in Java," 2010 available at https://www.gnostice.com/nl_article.asp?id=207&t=How_To_Read_A_PDF_File_From_A_URL_In_Java (Year: 2010).*

"List of PDF Software", retrieved from the Internet: https://en.wikipedia.org/wiki/List_of_PDF_software#Development_libraries, 19 pages.

Notice of Allowance received in U.S. Appl. No. 15/160,202 (8 pages) (dated Sep. 23, 2019).

* cited by examiner

MANIPULATION OF PDF FILES USING HTML AUTHORING TOOLS

FIELD OF THE DISCLOSURE

This disclosure relates to techniques for manipulation of Portable Document Format (PDF) file content, and more particularly, to techniques for extraction and modification of PDF file content and associated attributes using File Transfer Protocol (FTP) commands, as generated for example by Hyper Text Markup Language (HTML) authoring tools.

BACKGROUND

PDF files or documents generally include various types of data, which can be of value to consumers of the PDF files. This data can be as simple as the text and images rendered on the screen by a PDF viewer, but can also include resources such as file attachments, form data, annotations, metadata, and bookmarks. The PDF format is also increasingly being used as a container for a variety of presentation formats. Many of these alternative presentation formats are defined by HTML-related material including Cascading Style Sheets (CSS), HTML files, images, Javascript, Java Script Object Notation (JSON), etc. Although these PDF resources have value to a variety of applications, there are relatively few tools available that allow a user to edit all aspects of a PDF file. For example, although PDF files can contain HTML content, existing HTML authoring tools have no knowledge of internal PDF file formats. This is generally due to the fact that, in order to extract or edit such content in a PDF file, application developers must create, purchase, or otherwise include relatively sophisticated PDF parser libraries in their applications. These PDF parser libraries are typically written in low-level languages such as C, C #, C++, and Java, which tend to be complex and often require a higher level of programming skill to create and maintain. This can result in an application development process that is more complex and costly than would otherwise be the case, which in turn inhibits broad adoption and usage by those lacking the requisite technical skills.

DETAILED DESCRIPTION

Figure 1:
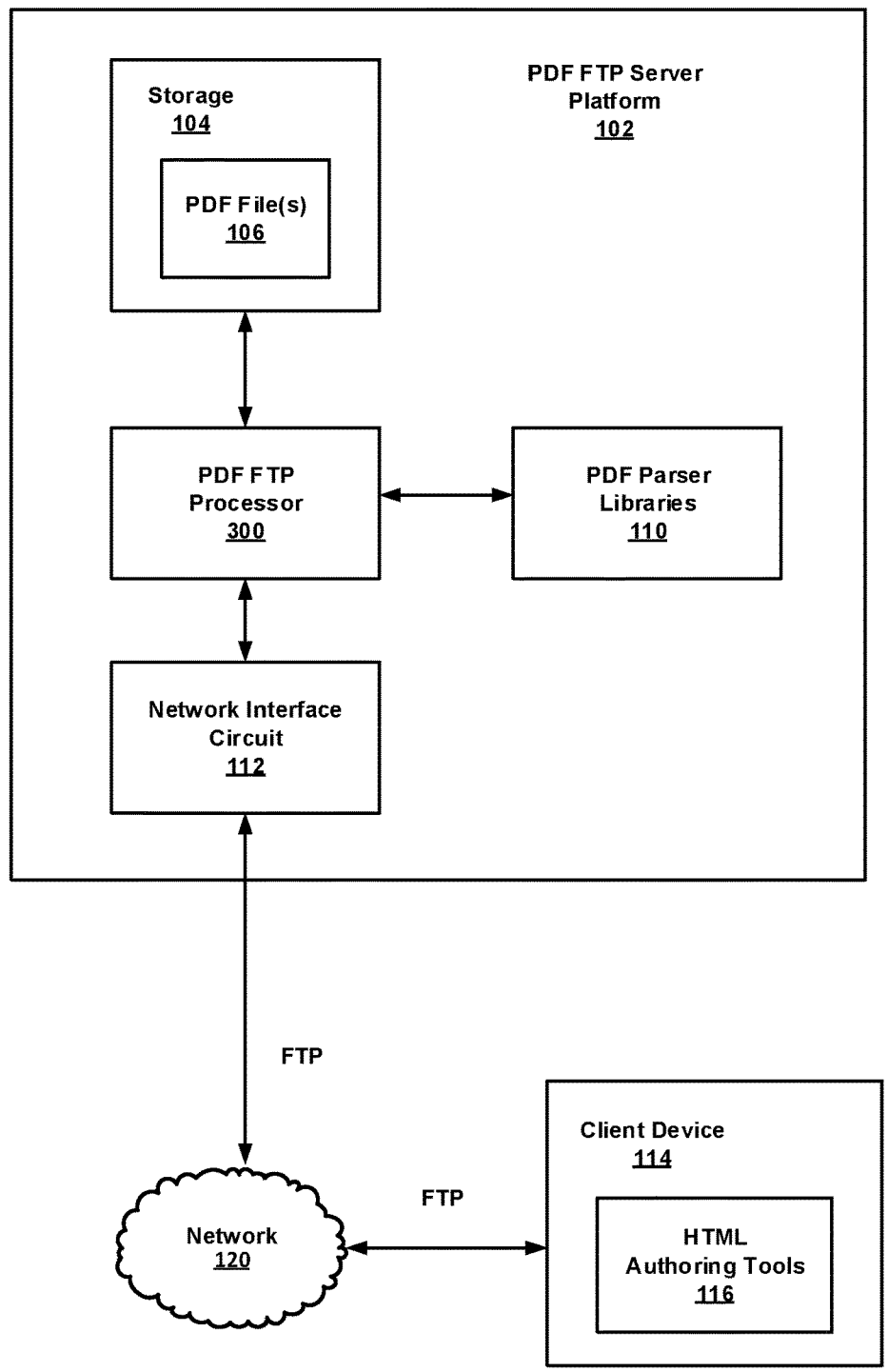
FIG. 1 is a block diagram of a PDF FTP client/server implementation, configured in accordance with an embodiment of the present disclosure.

There are instances where it is desirable for an application, executing on a user or client device, to be able to access, edit, and/or manipulate Portable Document Format (PDF) files, whether stored locally on the user device or stored remotely on a server system. In particular, when those PDF files contain presentation material that is defined by HTML-related content, it would be useful for a client HTML authoring tool (e.g., Adobe Dreamweaver or the like) executing on the user device to have the capability to edit most or all aspects of those PDF files. As just one example, a PDF file might represent a survey form with a list of questions, and a user of the client device might wish to add an interactive slider bar to the survey form to facilitate completion of the survey by survey participants. For instance, in one such specific example case, the user might wish to have a slider bar associated with each question which could range from "strongly agree" to "strongly disagree." The user could employ an HTML authoring tool to create the sliders, but existing authoring tools have no capability to access the PDF file internal components to add those sliders to the document. In order to accomplish this, the client-based authoring tools would need to download the PDF file, if stored on a server, and then parse the file in order to gain access to the PDF file contents and other various components related to the user's editing requests. In order to provide such capability, the developers of these HTML authoring tools (or other native applications) would generally need to create, purchase, or license relatively sophisticated PDF parser libraries for inclusion in their applications. As previously explained, these PDF parser libraries are typically written in low-level languages such as, for example, C, C #, and Java, and tend to be complex, often requiring a higher level of programming skill to create and maintain. Alternatively, if purchased or licensed, the cost for inclusion in each deployed copy of the client application could be prohibitive.

To this end, and in accordance with an embodiment of the present disclosure, techniques are disclosed to simplify the development and deployment of client based applications, particularly HTML authoring tools that benefit from the capability to access and/or manipulate PDF file content. This simplification is achieved by enabling the client based applications to access PDF manipulation capabilities, using an FTP communication protocol. In one embodiment, these PDF manipulation capabilities are provided to the client by a remote platform and accessed over a network. In another embodiment, the PDF manipulation capabilities are locally available on the client, thereby providing a self-contained client device and eliminating the need to access any remote platform. Thus, the disclosed techniques provide capabilities for extraction and modification of PDF file content based on FTP commands issued by the client application, as will be described in greater detail below. The FTP communication protocol provides a relatively simple command structure and directory path syntax, and is available for use as a standard client/server interface. Many existing client based authoring tools support FTP, which can be leveraged to enable them to provide PDF editing capability, as will be appreciated in light of this disclosure.

In more detail, and in accordance with an embodiment of the present disclosure, a PDF FTP processor is configured to provide PDF manipulation capabilities to client applications. In one embodiment, the PDF FTP processor is hosted on a remote platform and accessed by the client device over a network. In another embodiment, the PDF FTP processor is hosted on the client device. In any such cases, the PDF FTP processor is configured to receive FTP commands from any number of client applications, such as, for example, an HTML authoring tool. In one embodiment, the commands identify a PDF document and a type of access or operation (e.g., content or attribute modification, content extraction, etc.). In one embodiment, the FTP commands include a path syntax to identify components of the PDF document which are mapped, by the PDF FTP processor, to a hierarchical directory structure (e.g., a tree structure). In other words, the PDF file is treated as a container that mimics a filesystem, with the various PDF file components appearing to exist in files, folders, or subfolders, etc. Requested operation can then be performed on these components, as will be explained in greater detail below. For instance, in one example use case, the FTP command "get foo.pdf/properties.json" is issued by the client to obtain information about the properties of the PDF file "foo.pdf" in a JSON format. The PDF FTP processor is further configured to analyze the FTP commands and invoke function calls to a PDF parser library to perform the requested operations.

In another example use case, a user of an HTML authoring tool, or other such application executing on a client device, designs a slider bar for insertion into a PDF document. The client device in turn generates one or more FTP commands to access the relevant components of the PDF file to perform this operation. In one embodiment, the request is in the form of an FTP "put" command to add the slider as an attachment to the PDF file. For example, "put foo.pdf/attachments/slider.html," although other variations are possible, as will be apparent in light of this disclosure. The PDF FTP processor, whether it be local to the client in a self-contained client embodiment or remote to the client in a client/server embodiment, analyzes the received command, locates the file, and generates and executes a segment of code to perform the required operations to accomplish the task and return the results. In one embodiment, this includes invocation of the appropriate functions in a PDF parser library. The client application is thus automatically provided the capability to parse the PDF file in order to gain access to the file contents and other various components related to the user's request. In one embodiment, the access gained allows, for instance, modification of content of the PDF file, modification of attributes of the PDF file, and extraction of content from the PDF file, to name a few examples. Numerous other example scenarios and use cases will be apparent in light of this disclosure.

Thus, the foregoing framework provides an HTML authoring tool (or other such client application), with access to PDF manipulation functionality using the FTP protocol. The PDF manipulation functionality is provided by a PDF FTP processor implemented on a remote server or through another module of the client device. These techniques eliminate the need for costly client software to include, or directly access, complex PDF parser libraries, instead allowing the client to access and manipulate the PDF document in a simpler and more efficient manner through the PDF FTP processor, as specified by FTP commands.

System Architecture

FIG. 1 is a block diagram of a PDF FTP client/server implementation 100, configured in accordance with an embodiment of the present disclosure. As can be seen, a client-server configuration is implemented which includes a client device 114, communicatively coupled to a PDF FTP server platform or apparatus 102, via a communication network 120. In one embodiment, the network includes the internet. In some embodiments, the client device 114 can be any type of computing or communication device such as, for example, a workstation, desktop computer, laptop, handheld computer, tablet, smartphone, and the like. In one embodiment, the client device 114 is configured to run an HTML authoring tool for communication over network 120. In other embodiments, any other type of client native application 116 can be substituted for the HTML authoring tool 116.

The PDF FTP server platform 102 is shown to include a storage facility 104, a PDF FTP processor 300, PDF parser libraries 110, and network interface circuit 112. In one embodiment, the platform 102 also includes a processor and other hardware and software, as described in greater detail in connection with FIG. 6, below. The storage facility 104 is configured to store one or more PDF files 106. In some embodiments, the storage facility is located remotely from the platform 102 and any suitable communication mechanism is used to retrieve the files to the PDF FTP server platform 102 for processing. In other embodiments, the files remain at a separate hosting location and the processing is performed remotely. The network interface circuit 112 is configured to allow for communications between PDF FTP processor 300 and client device 114 over network 120, and in particular for the reception and transmission of FTP commands using any suitable network protocols implemented in hardware and/or software.

In one embodiment, the PDF FTP processor 300 is configured to receive FTP commands from client device 114, and to analyze those commands to identify a PDF file and a type of requested access to the identified file. The PDF FTP processor 300 is further configured to invoke one or more function calls to the PDF parser libraries 110, based on the type of requested access. The operation of the PDF FTP processor 300 will be explained in greater detail below in connection with the description of FIG. 3. The invoked functions of the parser libraries 110 are configured to operate on the identified PDF document to fulfill the client requests, as will also be described in greater detail below.

In some embodiments, the PDF FTP server platform 102 co-exists with, or otherwise hosts, the server with which the client device is attempting to interact. In other words, the PDF FTP server platform 102 shares, to at least some extent, the hosting of any type of online web site that the user is interested in for the purpose of accessing a particular PDF file.

Figure 2:
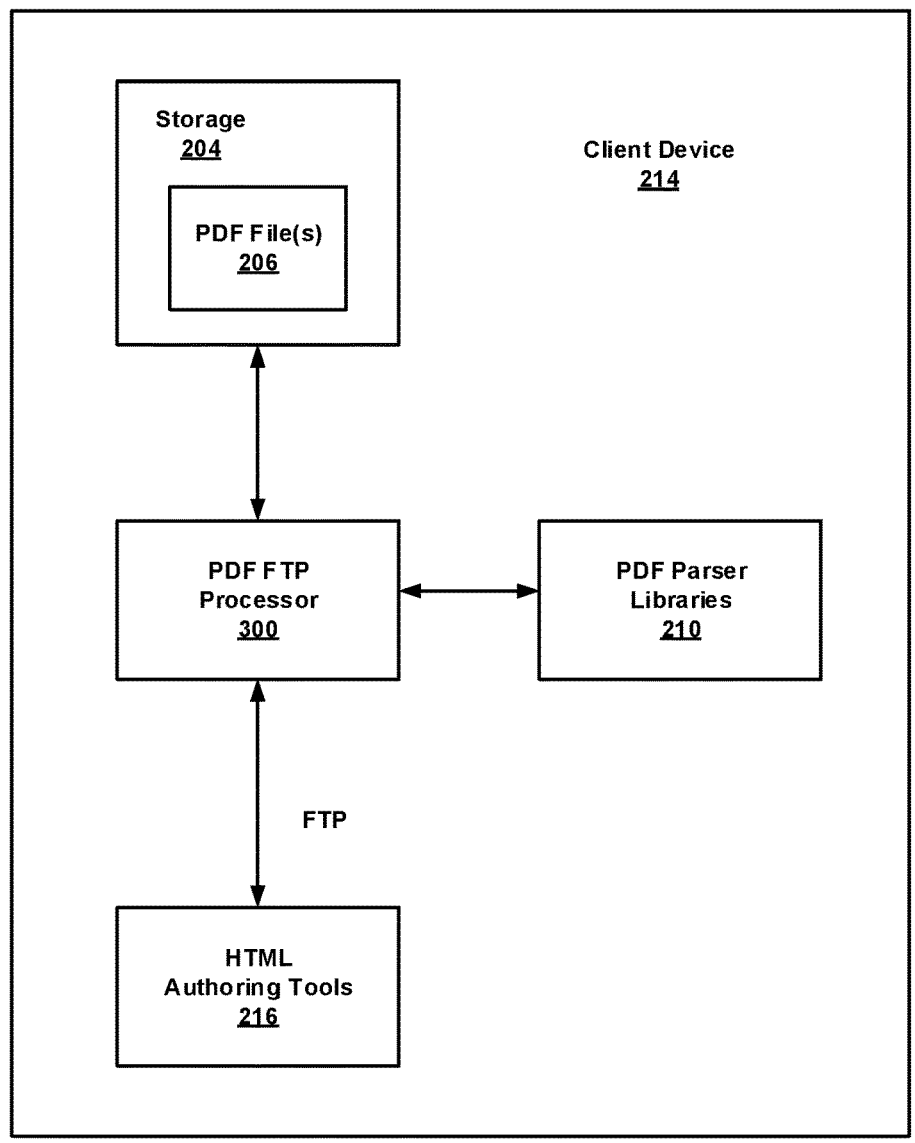
FIG. 2 is a block diagram of an alternative PDF FTP implementation on a client device, configured in accordance with an embodiment of the present disclosure.

FIG. 2 is a block diagram of an alternative PDF FTP implementation 200 on a client device 214, configured in accordance with an embodiment of the present disclosure. This embodiment is similar to the embodiment described in connection with FIG. 1, with the exception that the PDF FTP processor 300, along with PDF parser libraries 210 (and, in some embodiments, the stored PDF files 206), are located on the client device 214. In other words, client device 214 hosts HTML authoring tools 216 (as client device 114 hosts HTML authoring tools 116), but in addition, client device 214 also hosts the PDF FTP processor 300, eliminating the network connection 120. In this sense, the client device 214 is referred to herein as being self-contained as it can operate independently of any server or other remote platform and carry out the techniques variously provided herein.

Figure 3:
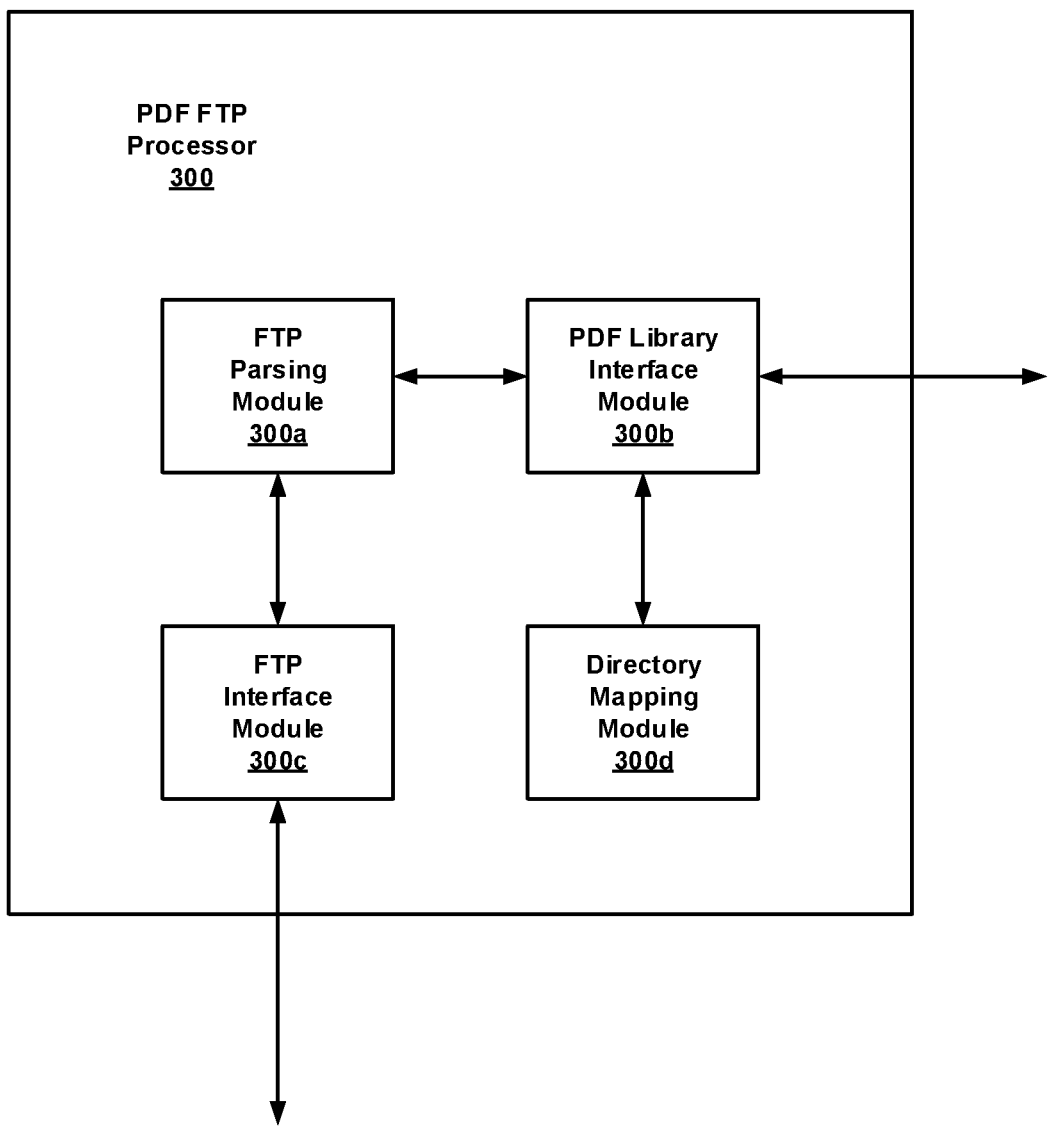
FIG. 3 is a more detailed block diagram of a PDF FTP processor, configured in accordance with an embodiment of the present disclosure. Note that the PDF FTP processor can be used in either of the embodiments shown in FIGS. 1 and 2

FIG. 3 is a more detailed block diagram of the PDF FTP processor 300, configured in accordance with an embodiment of the present disclosure. In one embodiment employing a client/server architecture, the PDF FTP processor 300 is implemented on the server side (e.g., platform 102). In another embodiment employing a self-contained client, the PDF FTP processor 300 is implemented on the client device 214. Note, however, that the PDF FTP processor 300 can be implemented in a similar fashion regardless of its location. The PDF FTP processor 300 is shown to include an FTP parsing module 300a, a PDF library interface module 300b, an FTP interface module 300c, and a directory mapping module 300d. Taken together, these various modules provide techniques for access to PDF file content, including extraction and modification, using FTP commands, as will be described in more detail below.

In one embodiment, the directory mapping module 300d is configured to map the components of a PDF file, for example a file named "foo.pdf," into a hierarchical directory structure such as, for example:

```
foo.pdf/attachments/a1.csv
       /attachments/a2.jpg
       /fonts.json
       /info.json
       /properties.json
       /form-data.json
```

Various subfolders are provided for attachments, fonts, information, properties and form-data, to list just a few possible examples. Each folder can have any number of files or further subfolders, as needed. In this example there are two file attachments in the attachments folder: a1.csv and a2.jpg.

This directory mapping allows for the receiving of an FTP command having a structure and path syntax that can specify any component of a PDF file for manipulation. For example, FTP commands received from the client access the folders, subfolders, etc. to manipulate the PDF file components. In one embodiment, the "cd" command, which stands for change directory, is used to indicate that subsequent commands are to be applied to the specified file associated with that directory name (e.g., "foo.pdf"). The "ls" command generates a list of the contents of the current directory, including subfolders, which correspond to the components of that PDF file. The "get" command is used to retrieve file components and the "put" command is used to write or modify file components.

In the above example, a directory structure associated with a single file, foo.pdf, is shown. In general, however, any number of PDF files can be stored. A more inclusive example from a higher point in the directory structure appears as follows:

```
/pdf_files/file1.pdf
          /file1.pdf/attachments/a1.csv
          /file1.pdf/attachments/a2.jpg
          /file1.pdf/fonts.json
          ...
          /file2.pdf
          /file2.pdf/subfolder1
          /file2.pdf/subfolder2
          ...
```

In one embodiment, the FTP interface module 300c is configured to receive FTP commands from a client application such as an HTML authoring tool. In one embodiment, the FTP commands are received from a remote client device 114 over network 120. In another embodiment, the FTP commands are received from the client application executing on the local client device 214 (i.e., the client application and the FTP processor are executing on the same platform). The FTP interface module 300c can also be configured to transmit results back to the client application. In one embodiment, the results include status information (e.g., success or failure), file content, or any other information that is useful to the client. In one embodiment, the results, particularly file content, are formatted as native PDF data structures. In another embodiment, the results are translated to JavaScript Object Notation (JSON). In another embodiment, the results are translated to Extensible Markup Language (XML). In another embodiment, the results are translated to other formats convenient for the client application.

In one embodiment, the FTP parsing module 300a is configured to parse the FTP commands to identify a PDF file specified by the client and to determine the type of requested access to that file or document. In one embodiment, the FTP commands include any of the standard FTP commands that specify the type of action requested, including, but not limited to, "cd," "ls," "get," "put," and "delete." In some embodiments, the FTP commands further include a path configured to identify the file name, and the file component to be accessed. Examples of components associated with PDF files include file content (text and/or images), attachments, form data, annotations, metadata, bookmarks, and HTML content, to name a few. An example FTP command sequence is "cd foo.pdf; get attachments/a2.jpg," which is a request to obtain the "a2.jpg" attachment of the file "foo.pdf" from the PDF FTP processor. In one embodiment, the PDF file identified from the parsing of the FTP command (e.g., "foo.pdf") is stored, for example, at a storage facility that forms part of a server device or platform 102 that is remote from a client device 114 which hosts HTML authoring tools. In another embodiment, the identified PDF file is stored at any other suitable location from which it can be located and accessed by the PDF FTP processor 300.

In one embodiment, the PDF library interface module 300b is configured to invoke one or more function calls to the PDF parser libraries (110 or 210), based on the type of requested access. The library function calls are configured to operate on the identified PDF document, or a copy thereof, and perform the operations necessary to achieve the requested access. For example, upon determining that an FTP command to obtain a list of bookmarks associated with a specified PDF document has been received, the PDF library interface module 300b identifies one or more functions provided by the PDF parser libraries (110 or 210) to perform that task. The specific library function names, as well as the arguments that they require, the order in which they are invoked, as well as any additional supporting code, will generally depend on the particular library that is available for use, as many such libraries are commercially available, each potentially providing a unique interface. After identifying the appropriate library functions, PDF library interface module 300b invokes those functions and provides any required information (for example, as arguments or parameters). In one embodiment, the PDF library interface module 300b is further configured to accept any results that are returned by those functions, for subsequent transmission back to the client application as an FTP response. In some embodiments, the response is translated to a format suitable to the client.

Figure 4:
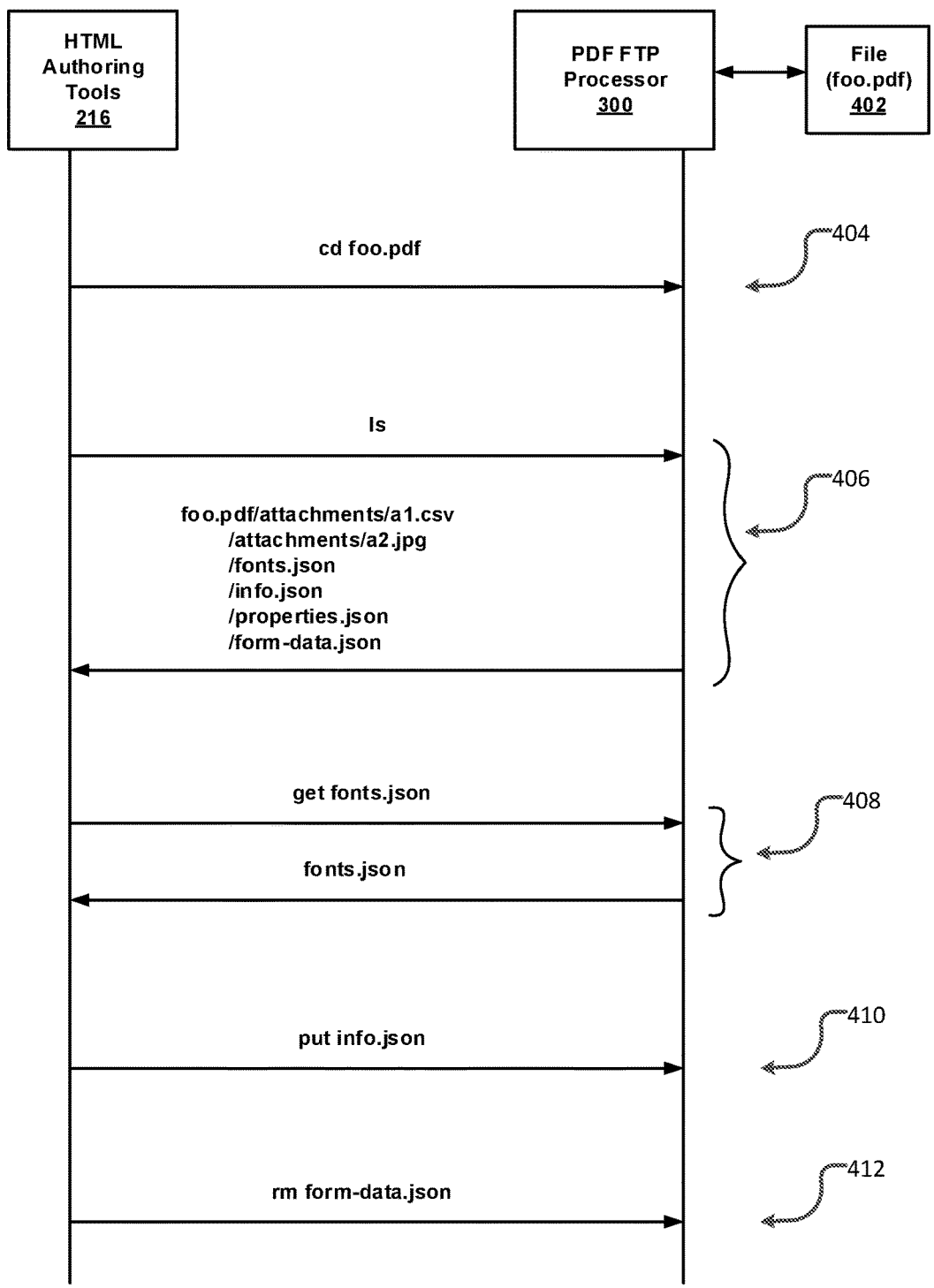
FIG. 4 illustrates a message flow diagram between an HTML authoring tool and a PDF FTP processor, configured in accordance with an embodiment of the present disclosure.

FIG. 4 illustrates a message flow diagram 400 between HTML authoring tools 116 and a PDF FTP processor 300, configured in accordance with an embodiment of the present disclosure. A first example interaction 404 includes an FTP command from the HTML authoring tool in the form:

cd foo.pdf

The command "cd" is used to indicate a change directory operation to move to the folder containing (e.g., mapped to) the file foo.pdf. This folder name, which matches the file name foo.pdf, serves as a root folder to which the file components are mapped. In one embodiment, additional subfolders and sub-subfolders, etc. are specified to which additional file components are mapped.

A second example interaction 406 includes an FTP command from the HTML authoring tool:

ls

The command "ls" is used to request a directory listing operation. The command is interpreted by the FTP parsing module 300*a* and transformed into a format suitable for use by the PDF library interface module which invokes the appropriate functions from the parser libraries 110. The result is a listing of the directory hierarchy structure associated with the file foo.pdf, which is returned to the HTML authoring tool.

A third example interaction 408 includes an FTP command from the HTML authoring tool:

get fonts.json

The command "get" is used to indicate a "read" type of operation. The remainder of the command specified the component on which to operate, in this case the fonts. The interaction concludes with a response that transmits the requested fonts associated with the file foo.pdf back to the HTML authoring tool. In one embodiment, the response is formatted as a native PDF data structure. In another embodiment, the response is translated to JavaScript Object Notation (JSON). In another embodiment, the response is translated to Extensible Markup Language (XML). In another embodiment, the response is translated to other formats convenient for the HTML authoring tool.

A fourth example interaction 410 includes an FTP command from the HTML authoring tool:

put info.json

The command "put" is used to indicate a "write" or modification type of operation, in this case a request to add or replace the file information component of the file foo.pdf with the specified data, in this case provided in JSON format. As with other types of file modification requests, in some embodiments, the original stored PDF file is modified. In other embodiments, a user associated copy of the PDF file is modified.

A fifth example interaction 412 includes an FTP command from the HTML authoring tool:

rm form_data.json

The command "rm" is used to indicate a "write" or modification type of operation, in this case a request to delete or remove all form data from the file foo.pdf (e.g., a form reset operation).

It will be appreciated that a sequence of FTP commands can be used to accomplish more complex operations. For example, the HTML authoring tool can "get" a component of a PDF file from the PDF FTP processor, edit that component locally (e.g., on the client device), and then "put" the modified component back into the PDF file through the PDF FTP processor.

In some embodiments, when file modifications are requested, the original PDF document is modified. In other embodiments, a copy of the document is created for association with the requesting user, and the copy is modified. The particular commands and their usage, as illustrated here, are provided as examples and, in other embodiments, the commands can be implemented in any suitable manner.

Methodology

Figure 5:
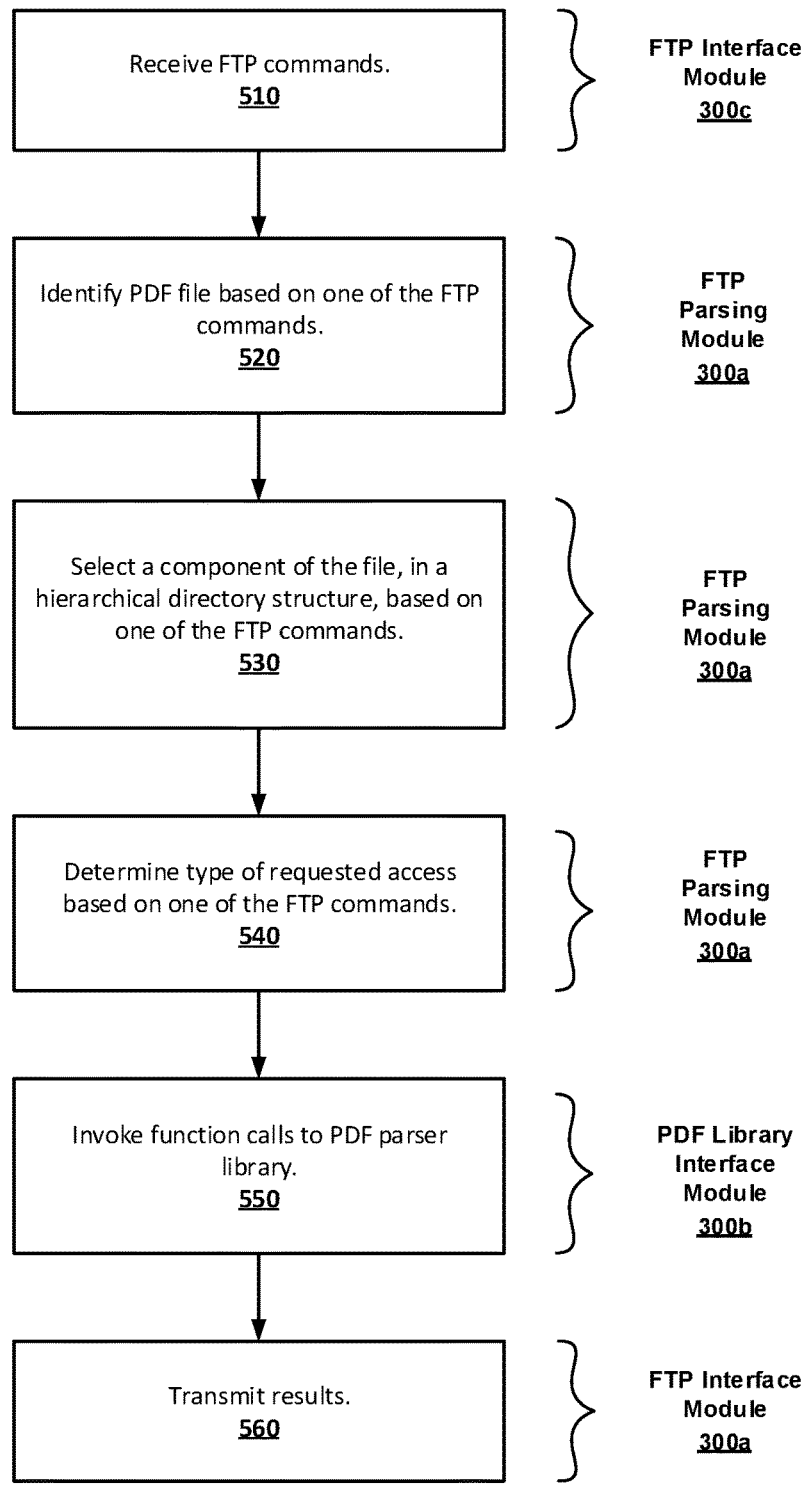
FIG. 5 is a flowchart illustrating a method for manipulation of PDF file content using FTP commands, in accordance with an embodiment of the present disclosure.

FIG. 5 is a flowchart illustrating a method 500 for manipulation of PDF file content using FTP commands, in accordance with an embodiment of the present disclosure. As can be seen, the method is described with reference to the configuration of PDF FTP processor 300 of FIG. 3. However, any number of PDF FTP processor configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 510, by receiving one or more FTP commands from a client application, for example an HTML authoring tool. In one embodiment, this operation is performed by FTP interface module 300*c*. In one embodiment, the FTP commands are received through a network connection, for example through the internet. The method continues, at operation 520, by identifying a PDF document or file based on one of the received FTP commands. In some embodiments, the FTP command "cd" (which stands for "change directory") is used to identify the PDF file, for example "cd foo.pdf," identifies the file "foo.pdf." In other words, each stored PDF file is referenced by a directory (or folder) name. In some embodiments, the PDF file includes any number of components and sub components that are mapped to a hierarchical directory structure, with the PDF file name at or near the root of that hierarchy.

Next, at operation 530, one of the components of the identified PDF file, in the hierarchical directory structure, is selected based on one of the received FTP commands. And, at operation 540, the type of requested access is also determined based on one of the received FTP commands. In one embodiment, types of access requests include, for example, read, write, and removal operations on PDF files or components thereof. In some embodiments, the FTP command specifies a path syntax, such as, for example, "get foo.pdf/attachments/a2.pjg." In this example, the FTP command "get" is used to indicate a retrieval type of access on the attachment component "a2.jpg" of the PDF file "foo.pdf." In some embodiment, FTP commands include, for example, "cd," "ls," "get," "put," and "delete," as previously described. In one embodiment, the FTP parsing module 300*a* is configured to perform operations 520, 530, and 540 by parsing the syntax of the command and path to determine the file name, component, and access type.

At operation 550, one or more function calls to a PDF parser library are invoked, based on the type of requested access, to operate on the identified PDF document to perform the requested type of access. In one embodiment, these operations are performed on components of the PDF documents that are selected based on the path included in the FTP command to specify the component location in the hierarchical directory structure. Examples of such components include text content, images, fonts, annotations, attachments, bookmarks, and metadata. In one embodiment, the function calls are invoked by the PDF library interface module 300*b*. In one embodiment, the PDF parser library is configured to provide any functions necessary to perform any of the various types of operations on a PDF file or file components that might be requested.

In some embodiments, additional operations are performed. For example, in one embodiment, at operation 560, the results generated by the invoked function calls are transmitted back to the client application. The results include status information and/or content of the identified PDF document. In one embodiment, the results, particularly file content, are formatted as native PDF data structures. In another embodiment, the transmitted content is translated to JavaScript Object Notation (JSON). In another embodiment, the transmitted content is translated to Extensible Markup Language (XML). In another embodiment, the transmitted content is translated to other formats convenient for further processing by the client application, for example, an HTML authoring tool executing on the client.

Example Server Platform

Figure 6:
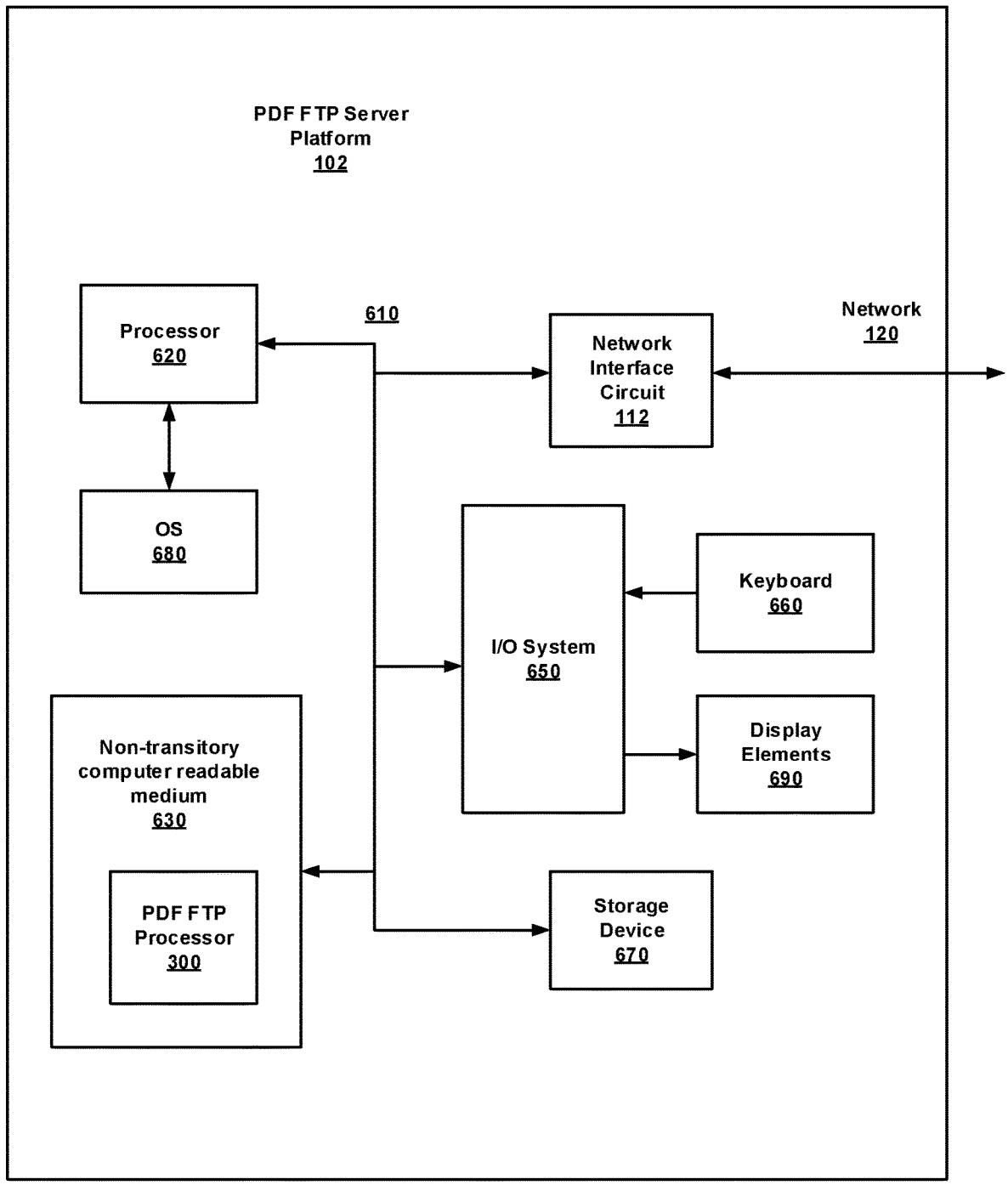
FIG. 6 is a block diagram schematically illustrating a computing device configured to perform any of the techniques as variously described in this disclosure, configured in accordance with an embodiment of the present disclosure.

FIG. 6 is a block diagram schematically illustrating a computing device 600 used to perform any of the techniques as variously described in this disclosure. For example, in some embodiments, the PDF FTP server platform 102 of FIG. 1, or any portions thereof, and the methodologies of FIG. 5, or any portions thereof, are implemented in the computing device 600. In some embodiments, the computing device 600 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing device 600 includes one or more storage devices 670 and/or non-transitory computer-readable media 630 having encoded thereon one or more computer-executable instructions or software for implementing techniques as variously described in this disclosure. In some embodiments, the storage devices 670 includes a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 670 includes other types of memory as well, or combinations thereof. In one embodiment, the storage device 670 is provided on the computing device 600. In another embodiment, the storage device 670 is provided separately or remotely from the computing device 600. The non-transitory computer-readable media 630 include, but are not limited to, one or more types of hardware memory, non-transitory tangible media (for example, one or more magnetic storage disks, one or more optical disks, one or more USB flash drives), and the like. In some embodiments, the non-transitory computer-readable media 630 included in the computing device 600 store computer-readable and computer-executable instructions or software for implementing various embodiments. In one embodiment, the computer-readable media 630 are provided on the computing device 600. In another embodiment, the computer-readable media 630 are provided separately or remotely from the computing device 600.

The computing device 600 also includes at least one processor 620 for executing computer-readable and computer-executable instructions or software stored in the storage device 670 and/or non-transitory computer-readable media 630 and other programs for controlling system hardware. In some embodiments, virtualization is employed in the computing device 600 so that infrastructure and resources in the computing device 600 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus and/or interconnect 610 is also provided to allow for communication between the various components listed above and/or other components not shown. Computing device 600 can be coupled to a network 120 (e.g., a local or wide area network such as the internet), through network interface circuit 112 to allow for communications with other computing devices, platforms, resources, and clients.

In some embodiments, a user interacts with the computing device 600 through an input/output system 650 that interfaces with devices such as keyboard 660 and display element (screen/monitor) 690 which provides a user interface to accept commands and display results including PDF files and associated information. In some embodiments, the computing device 600 includes other I/O devices (not shown) for receiving input from a user, for example, a joystick, a game controller, a pointing device (e.g., a mouse, a user's finger interfacing directly with a display device, etc.), or any suitable user interface. In some embodiments, the computing device 600 includes other suitable conventional I/O peripherals. The computing device 600 can include and/or be operatively coupled to various suitable devices for performing one or more of the aspects as variously described in this disclosure, such as digital cameras for acquiring digital images.

In some embodiments, the computing device 600 run an operating system (OS) 680, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing device 600 and performing the operations described in this disclosure. In one embodiment, the operating system runs on one or more cloud machine instances.

As will be appreciated in light of this disclosure, the various modules and components of the system, including the PDF FTP processor 300 (and subcomponents 300a, 300b, 300c, and 300d) can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 600, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a mouse, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

EXAMPLE EMBODIMENTS

Numerous example embodiments will be apparent, and features described herein can be combined in any number of configurations.

Example 1 includes an apparatus to provide access to Portable Document Format (PDF) files from a client device using File Transfer Protocol (FTP) commands. The apparatus includes a storage facility configured to store one or more PDF files and a PDF FTP processor. The PDF processor comprises: an FTP interface module configured to receive one or more FTP commands from the client device; a directory mapping module configured to map components of the PDF files to a hierarchical directory structure; and an FTP parsing module. The FTP parsing module is configured to: identify a PDF file of the one or more PDF files in the storage facility, based on one of the FTP commands; select a component of the identified PDF file in the hierarchical directory structure, based on one of the FTP commands; determine a type of requested access to the identified PDF file, based on one of the FTP commands; invoke one or more function calls to a PDF parser library, based on the type of requested access, the function calls to operate on the selected components of the PDF file to perform the requested type of access.

Example 2 includes the subject matter of Example 1, wherein the FTP commands are received from a Hyper Text Markup Language (HTML) authoring tool executing on the client device.

Example 3 includes the subject matter of Examples 1 or 2, wherein the FTP interface module is further configured to transmit results to the client device, the results comprising content of the identified PDF file formatted as one or more of: native PDF data structures; JavaScript Object Notation (JSON); and Extensible Markup Language (XML).

Example 4 includes the subject matter of any of Examples 1-3, wherein the FTP commands comprise one or more of "cd," "ls," "get," "put," and "delete."

Example 5 includes the subject matter of any of Examples 1-4, wherein the selected components comprise one or more of text content, images, fonts, annotations, attachments, bookmarks, and metadata.

Example 6 includes the subject matter of any of Examples 1-5, wherein the FTP parsing module is further configured to identify the PDF file based on an FTP "cd" command; and to provide a list of the components of the identified PDF file in response to receiving an FTP "ls" command.

Example 7 includes the subject matter of any of Examples 1-6, wherein the type of requested access comprises modification of content of the identified PDF file, modification of attributes of the identified PDF file, and extraction of content of the identified PDF file.

Example 8 includes a device to provide access to Portable Document Format (PDF) files using File Transfer Protocol (FTP) commands. The device includes a storage facility configured to store one or more PDF files and a PDF FTP processor. The PDF processor comprises: an FTP interface module configured to receive one or more FTP commands from a Hyper Text Markup Language (HTML) authoring tool executing on the device; a directory mapping module configured to map components of the PDF files to a hierarchical directory structure; and an FTP parsing module. The FTP parsing module is configured to: identify a PDF file of the one or more PDF files in the storage facility, based on one of the FTP commands; select a component of the identified PDF file in the hierarchical directory structure, based on one of the FTP commands; determine a type of requested access to the identified PDF file, based on one of the FTP commands; invoke one or more function calls to a PDF parser library, based on the type of requested access, the function calls to operate on the selected components of the PDF file to perform the requested type of access.

Example 9 includes the subject matter of Example 8, wherein the FTP interface module is further configured to transmit results to the HTML authoring tool, the results comprising content of the identified PDF file formatted as one or more of: native PDF data structures; JavaScript Object Notation (JSON); and Extensible Markup Language (XML).

Example 10 includes the subject matter of Examples 8 or 9, wherein the FTP commands comprise one or more of "cd," "ls," "get," "put," and "delete."

Example 11 includes the subject matter of any of Examples 8-10, wherein the selected components comprise one or more of text content, images, fonts, annotations, attachments, bookmarks, and metadata.

Example 12 includes the subject matter of any of Examples 8-11, wherein the FTP parsing module is further configured to identify the PDF file based on an FTP "cd" command; and to provide a list of the components of the identified PDF file in response to receiving an FTP "ls" command.

Example 13 includes the subject matter of any of Examples 8-12, wherein the type of requested access comprises modification of content of the identified PDF file, modification of attributes of the identified PDF file, and extraction of content of the identified PDF file.

Example 14 includes a method to provide access to Portable Document Format (PDF) files using File Transfer Protocol (FTP) commands. The method comprises: receiving one or more FTP commands; identifying a PDF file, based on one of the FTP commands, the PDF file comprising components mapped to a hierarchical directory structure; selecting one of the components of the identified PDF file in the hierarchical directory structure, based on one of the FTP commands; determining a type of requested access to the identified PDF file, based on one of the FTP commands; and invoking one or more function calls to a PDF parser library, based on the type of requested access, the function calls to operate on the selected components of the PDF file to perform the requested type of access.

Example 15 includes the subject matter of Example 14, further comprising transmitting results generated by the invoked function calls, wherein the results comprise content of the identified PDF file formatted as one or more of: native PDF data structures; JavaScript Object Notation (JSON); and Extensible Markup Language (XML).

Example 16 includes the subject matter of Examples 14 or 15, wherein the FTP commands comprise one or more of "cd," "ls," "get," "put," and "delete."

Example 17 includes the subject matter of any of Examples 14-16, wherein the selected components comprise one or more of text content, images, fonts, annotations, attachments, bookmarks, and metadata.

Example 18 includes the subject matter of any of Examples 14-17, further comprising identifying the PDF file based on an FTP "cd" command; and providing a list of the components of the identified PDF file in response to receiving an FTP "ls" command.

Example 19 includes the subject matter of any of Examples 14-18, wherein the type of requested access comprises modification of content of the identified PDF file, modification of attributes of the identified PDF file, and extraction of content of the identified PDF file.

Example 20 includes the subject matter of any of Examples 14-19, wherein the FTP commands are received from a Hyper Text Markup Language (HTML) authoring tool.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. An apparatus to provide access to Portable Document Format (PDF) files from a client device using File Transfer Protocol (FTP) commands, the apparatus comprising:
   a storage facility configured to store a plurality of PDF files; and
   a PDF FTP processor comprising:
      an FTP interface module that receives FTP commands from a Hyper Text Markup Language (HTML) authoring tool executing on a client device, the FTP commands including (a) a "cd" command that identifies a particular PDF file from amongst the plurality of PDF files, and (b) a "put" command that identifies a new component saved on the client device that is to be inserted into the particular PDF file;
      a directory mapping module that maps components of the particular PDF file to a hierarchical directory structure; and
      an FTP parsing module that:
         identifies the particular PDF file from amongst the PDF files in the storage facility, based on the "cd" command; and
         invokes a function call to a PDF parser library, the function call causing the new component identified by the "put" command to be inserted into the particular PDF file identified by the "cd" command, such that the new component forms part of the particular PDF file.

2. The system of claim 1, wherein the particular PDF file includes a form, and wherein the new component comprises data that is provided in the form in response to invoking the function call.

3. The system of claim 1, wherein the new component comprises one or more of text content, images, fonts, annotations, attachments, bookmarks, and metadata.

4. The system of claim 1, wherein the FTP parsing module further provides a list of components included in the particular PDF file in response to receiving an FTP "ls" command.

5. A device to provide access to Portable Document Format (PDF) files using File Transfer Protocol (FTP) commands, the device comprising:
   a storage facility configured to store one or more PDF files; and
   a PDF FTP processor comprising:
      an FTP interface module that receives one or more FTP commands from a Hyper Text Markup Language (HTML) authoring tool executing on the device;
      a directory mapping module that maps components of the PDF files to a hierarchical directory structure; and
      an FTP parsing module that:
         identifies a PDF file of the one or more PDF files in the storage facility, based on one of the FTP commands, wherein the identified PDF file comprises a plurality of components;
         selects exactly one component of the identified PDF file in the hierarchical directory structure, based on one of the FTP commands;
         determines a type of requested access to the identified PDF file, based on one of the FTP commands, wherein the determined type of access is selected from a group consisting of modification of content of the identified PDF file, modification of attributes of the identified PDF file, and extraction of content from the identified PDF file;
         invokes one or more function calls to a PDF parser library, based on the type of requested access, the function calls selectively operating on the one selected component of the identified PDF file to perform the requested type of access.

6. The device of claim 5, wherein the FTP interface module further transmits results to the HTML authoring tool, the results comprising content of the identified PDF file formatted as one or more of: native PDF data structures; JavaScript Object Notation (JSON); and Extensible Markup Language (XML).

7. The device of claim 5, wherein the FTP commands comprise one or more of "cd," "ls," "get," "put," and "delete."

8. The device of claim 5, wherein the selected component comprises one or more of text content, images, fonts, annotations, attachments, bookmarks, and metadata.

9. The device of claim 5, wherein the FTP parsing module further identifies the PDF file based on an FTP "cd" command; and provides a list of the components of the identified PDF file in response to receiving an FTP "ls" command.

10. A method to provide access from a client device to Portable Document Format (PDF) files using File Transfer Protocol (FTP) commands, the method comprising:
   receiving, by a processor, one or more FTP commands from a Hyper Text Markup Language (HTML) authoring tool executing on the client device;
   mapping components of one or more PDF files to a hierarchical directory structure;
   identifying, by the processor, one of the PDF files based on one of the FTP commands, the identified PDF file comprising at least one of the components mapped to the hierarchical directory structure;
   selecting, by the processor, a particular one of the components of the identified PDF file in the hierarchical directory structure, based on one of the FTP commands;
   determining, by the processor, a type of requested access to the identified PDF file, based on one of the FTP commands, wherein the determined type of access is selected from a group consisting of modification of content of the identified PDF file, modification of attributes of the identified PDF file, and extraction of content from the identified PDF file;
   invoking, by the processor, one or more function calls to a PDF parser library, based on the type of requested access, the function calls to selectively operate on the particular selected component of the identified PDF file to perform the requested type of access.

11. The method of claim 10, further comprising transmitting results generated by the invoked function calls, wherein the results comprise content of the identified PDF file formatted as one or more of: native PDF data structures; JavaScript Object Notation (JSON); and Extensible Markup Language (XML).

12. The method of claim 10, wherein the FTP commands comprise one or more of "cd," "ls," "get," "put," and "delete."

13. The method of claim 10, wherein the particular selected component is selected from a group consisting of text content, images, fonts, annotations, attachments, bookmarks, and metadata.

14. The method of claim 10, further comprising identifying the PDF file based on an FTP "cd" command; and providing a list of the components of the identified PDF file in response to receiving an FTP "ls" command.

\* \* \* \* \*